United States Patent
Yokoyama

(10) Patent No.: US 9,538,466 B2
(45) Date of Patent: Jan. 3, 2017

(54) COMMUNICATION SYSTEM, COMMUNICATION METHOD, MOBILE TERMINAL, DEVICE, AND BASE STATION

(71) Applicant: FUJITSU LIMITED, Kawasaki-shi, Kanagawa (JP)

(72) Inventor: Hitoshi Yokoyama, Shinagawa (JP)

(73) Assignee: FUJITSU LIMITED, Kawasaki (JP)

( * ) Notice: Subject to any disclaimer, the term of this patent is extended or adjusted under 35 U.S.C. 154(b) by 460 days.

(21) Appl. No.: 13/943,279

(22) Filed: Jul. 16, 2013

(65) Prior Publication Data

US 2013/0308514 A1    Nov. 21, 2013

Related U.S. Application Data

(63) Continuation of application No. PCT/JP2011/051123, filed on Jan. 21, 2011.

(51) Int. Cl.
*H04W 52/02* (2009.01)

(52) U.S. Cl.
CPC ..... *H04W 52/0206* (2013.01); *H04W 52/0235* (2013.01); *H04W 52/0241* (2013.01); *Y02B 60/50* (2013.01)

(58) Field of Classification Search
None
See application file for complete search history.

(56) References Cited

U.S. PATENT DOCUMENTS 8,811,905 B1 *  8/2014  Hui ............... H04W 52/243
                                                 455/561
2010/0317394 A1 * 12/2010  Harris ............ H04W 52/367
                                                 455/522

(Continued)

FOREIGN PATENT DOCUMENTS

EP    2 096 887 A1    9/2009
EP    2 387 266 A2    11/2011
(Continued)

OTHER PUBLICATIONS

International Search Report; PCT/JP2011/051123, Feb. 22, 2011.
Extended European Search Report of European Patent Application No. 11856587.8 dated May 3, 2016.

*Primary Examiner* — Huy D Vu
*Assistant Examiner* — Hong Shao
(74) *Attorney, Agent, or Firm* — Arent Fox LLP

(57) ABSTRACT

A communication system includes a base station and a mobile terminal device. The base station includes a detection information notifying unit. The detection information notifying unit notifies, using a predetermined control channel, the mobile terminal device of detection information that includes a power-saving time that indicates a time that elapses before the base station enters a power-saving state. The mobile terminal device includes a detecting unit and a region information notifying unit. The detecting unit, when being notified of the detection information by the detection information notifying unit, detects a region in which a mobile terminal device is not capable of communicating with any base station based on the power-saving time included in the detection information. The region information notifying unit notifies a given base station of information on the region detected by the detecting unit.

9 Claims, 9 Drawing Sheets

(56) References Cited

U.S. PATENT DOCUMENTS

2011/0195707 A1* 8/2011 Faerber ................ H04W 24/08
455/423
2011/0319125 A1 12/2011 Nakano

FOREIGN PATENT DOCUMENTS

| JP | 2002-271833 A | 9/2002 |
|----|---------------|--------|
| JP | 2002-359867 A | 12/2002 |
| JP | 2010-193290 A | 9/2010 |
| JP | 2010-226704 A | 10/2010 |
| JP | 2011-019109 A | 1/2011 |
| WO | WO 2010/040417 A1 | 4/2010 |
| WO | WO 2010/079960 A2 | 7/2010 |

* cited by examiner

COMMUNICATION SYSTEM, COMMUNICATION METHOD, MOBILE TERMINAL, DEVICE, AND BASE STATION

CROSS-REFERENCE TO RELATED APPLICATION

This application is a continuation application of International Application PCT/JP2011/051123, filed on Jan. 21, 2011, and designating the U.S., the entire contents of which are incorporated herein by reference.

FIELD

The present invention relates to a communication system, a communication method, a mobile terminal device, and a base station.

BACKGROUND

Recently, in radio networks for mobile phones, PHSs (Personal Handy-phone Systems), and the like, the occurrence of coverage holes has become a problem. A coverage hole is an area in which communication is unavailable and its range dynamically changes depending on the surrounding radio environment. It is difficult for mobile terminal devices to perform communication in a coverage hole; therefore, it is important in terms of the connectivity of radio networks to minimize the occurrence of coverage holes.

Therefore, there has recently been a technology for detecting coverage holes. One form of the technology for detecting coverage holes is such that radio quality, location information, and the like obtained when a radio link failure occurs are recorded in a mobile terminal device when triggered by the radio link failure (RLF: Radio Link Failure) that occurs when a communicating mobile terminal device passes through a coverage hole. When the mobile terminal device recovers from the radio link failure, the mobile terminal device that has recorded the radio quality, location information, and the like obtained when the radio link failure occurs notifies a control server of the recorded information. Based on the information whose notification is made by each mobile terminal device, the control server instructs each base station to, for example, adjust the transmission power value of a base station that becomes a factor in causing a coverage hole or to turn on the power.

Patent Literature 1: Japanese Laid-open Patent Publication No. 2002-271833

Meanwhile, with the widespread use of mobile terminal devices, data communication traffic due to the Internet connection has been increasing, and in response to this, the total power consumption of networks due to the Internet connection has also been increasing. In view of such an increase in the total power consumption, for example, in the 3GPP (3rd Generation Partnership Project) 32.826, specifications have been examined in which the total power consumption is reduced by introducing network operations that are in accordance with the traffic.

For example, in the specifications of the 3GPP, a base station collects information on the traffic, the electric energy, and the like and notifies a control server of the collected information. The control server determines the electric energy in accordance with the traffic based on the information whose notification is made by a plurality of base stations and, for example, indicates a setting transmission power value to each base station or instructs each base station to turn on/off the power. Consequently, in the specifications of the 3GPP, the total power consumption of the networks due to the Internet connection is reduced.

In the specifications of the 3GPP, although the total power consumption can be reduced, a coverage hole may occur around a base station for which the transmission power value is adjusted or that has its power off. In other words, in the specifications of the 3GPP, in order to reduce the total power consumption, the transmission power value of a base station is adjusted or the power of a base station is turned off without examining a coverage hole in advance during the design phase of the network; therefore, a coverage hole may occur.

However, in the conventionally technology, because a coverage hole is detected when triggered by a radio link failure, there is a problem in that it is difficult for a coverage hole that occurs when a base station performs power control to be efficiently detected.

SUMMARY

According to an aspect of the embodiments, a communication system includes a base station and a mobile terminal device. The base station includes a detection information notifying unit that notifies, using a predetermined control channel, the mobile terminal device of detection information that includes a power-saving time that indicates a time that elapses before the base station enters a power-saving state. The mobile terminal device includes a detecting unit that, when being notified of the detection information by the detection information notifying unit, detects a region in which a mobile terminal device is not capable of communicating with any base station based on the power-saving time included in the detection information, and a region information notifying unit that notifies a given base station of information on the region detected by the detecting unit.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Hereinafter, embodiments of a communication system, a communication method, a mobile terminal device, and a base station disclosed in the present application will be described with reference to the accompanying drawings. The present invention is not limited to the following embodiments. Moreover, each embodiment can be combined as appropriate to the extent that there is no contradiction.

First Embodiment

[Network Configuration]

Figure 1:
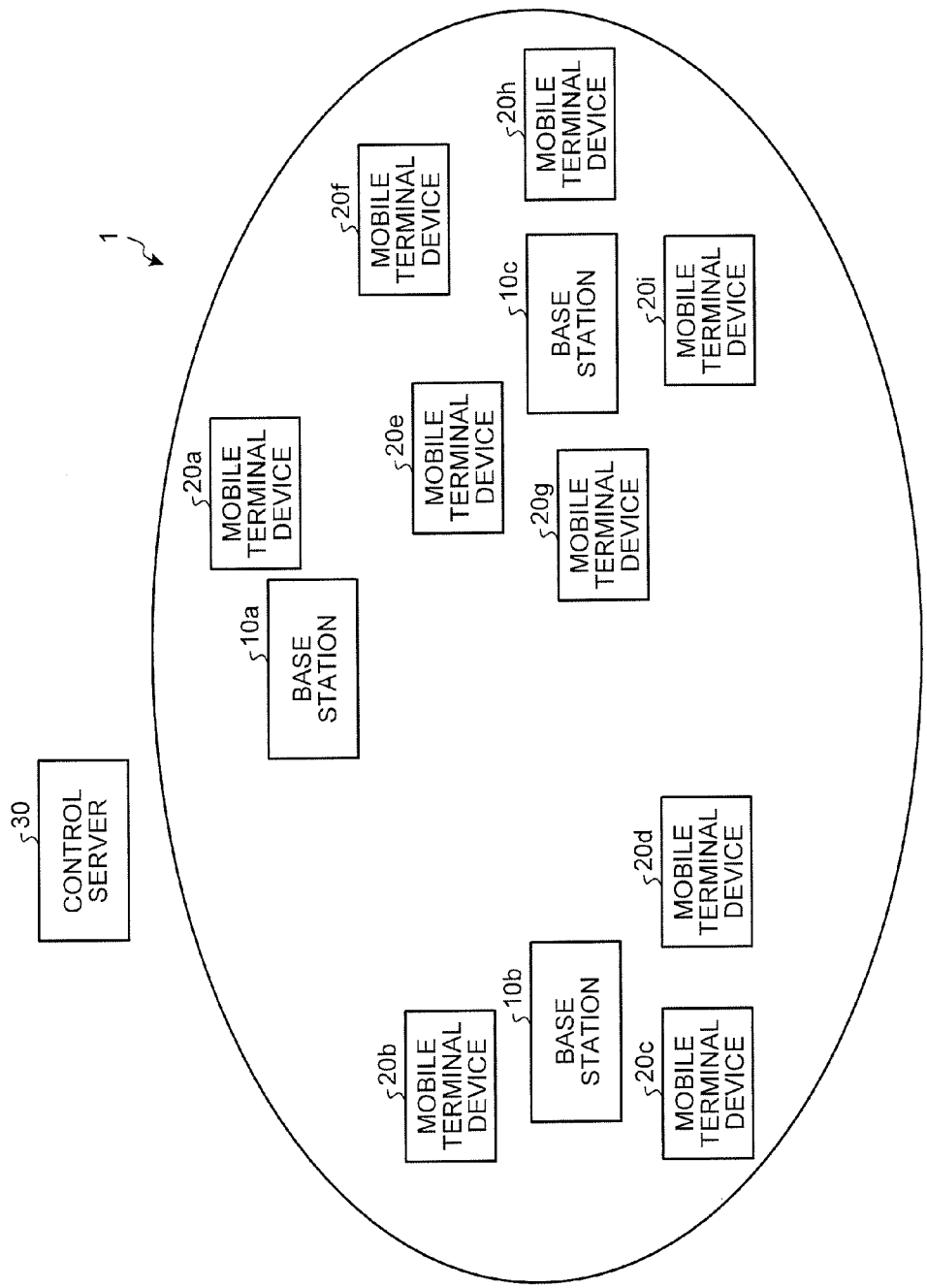
FIG. 1 is a diagram illustrating a configuration example of a network that includes a communication system.

The configuration of a network that includes a communication system disclosed in the present application will be explained with reference to FIG. 1. FIG. 1 is a diagram illustrating a configuration example of the network that includes the communication system.

For example, as illustrated in FIG. 1, the network that includes a communication system 1 includes base stations 10a to 10c, mobile terminal devices 20a to 20i, and a control server 30. In this network, the communication system 1 includes the base stations 10a to 10c and the mobile terminal devices 20a to 20i.

Moreover, the ellipse illustrated in FIG. 1 indicates the entire range of the communication region of the base stations when all the base stations 10a to 10c are operating. Specifically, the mobile terminal device 20a can communicate with the base station 10a, the mobile terminal devices 20b to 20d can communicate with the base station 10b, and the mobile terminal devices 20e to 20i can communicate with the base station 10c. The number of the base stations, the number of the mobile terminal devices, and the number of the control servers are not limited to those illustrated in the drawing.

In the following, a case is explained in which, in the above configuration, the power of the base station 10a is turned off in order to reduce the total power consumption of the network. Moreover, a case is explained in which the mobile terminal device 20a, which is present in the communication region of the base station 10a, is in a communication disabled state, i.e., in an idle state. The control server 30 instructs each base station to turn off the power or adjust the transmission power value.

The control server 30, for example, instructs the base station 10a to turn off the power. The base station 10a that has received the instruction from the control server 30, for example, notifies the mobile terminal device 20a of the detection information that includes the power-saving time, which indicates the time that elapses before the station itself enters the power-saving state, and the detection time, which indicates the time during which a region is detected in which it is difficult for a mobile terminal device to communicate with any base stations. In this example, the power-saving time is the time that elapses before the power of the station itself is turned off. Moreover, in terms of the relationship between the power-saving time and the detection time, the detection time is longer than the power-saving time. At this time, the base station 10a notifies the mobile terminal device 20a of the detection information using a predetermined control channel. In other words, the base station 10a notifies all the mobile terminal devices that are present in its own communication region of the detection information using a predetermined control channel. Thereafter, when the power-off time has been reached, the base station 10a turns off its own power such that it is difficult for the base station 10a to communicate with any mobile terminal devices.

Meanwhile, the mobile terminal device 20a that is notified of the detection information from the base station 10a transitions, for example, to the communication-enabled state (Active state) from the communication-disabled state (idle state). Then, the mobile terminal device 20a that has transitioned to the communication-enabled state, for example, detects a coverage hole, which is a region in which it is difficult for the device itself to communicate with any base stations, during the detection time after the power-saving time included in the detection information has elapsed. For detecting a coverage hole, when triggered by the occurrence of a radio link failure (RLF), the mobile terminal device 20a in the communication-enabled state stores, in a memory, the radio quality, location information, time information, and the like at this point.

Next, the mobile terminal device 20a that has detected a coverage hole, for example, notifies a given base station of the information on the detected coverage hole. Here, the given base station means the base station 10b or the base station 10c. In other words, when the mobile terminal device 20a that has moved out of the coverage hole becomes such that it can communicate with the base station 10b or the base station 10c, the mobile terminal device 20a notifies the base station 10b or the base station 10c of the information on the coverage hole stored in the memory. Examples of the information on the coverage hole include information that indicates that the coverage hole is detected, and the radio quality, location information, time information, and the like obtained when the coverage hole is detected. The location information is, for example, information that is obtained near a coverage hole using GPS (Global Positioning System) or the like.

The base station 10b or the base station 10c that is notified of the information on the coverage hole from the mobile terminal device 20a, for example, transfers the information on the coverage hole to the control server 30. In order to eliminate the coverage hole, the control server 30 that has received the information on the coverage hole, for example, instructs the base station 10a to turn on the power or set the transmission power value to a desired transmission power value based on the information on the coverage hole.

In other words, in the communication system 1, the mobile terminal device 20a is caused to transition to the Active state from the idle state when triggered by being notified of the detection information, which includes the power-saving time and the detection time, from the base station 10a and is caused to detect a coverage hole. Moreover, a mobile terminal device that has been in the Active state, unlike the mobile terminal device 20a that was originally in the idle state, is also caused to detect a coverage hole during the detection time after the power-saving time. As a result, the communication system 1 increases the number of mobile terminal devices that contribute to the detection of a coverage hole; therefore, the time needed to detect a coverage hole can be reduced compared with the related technology in which a coverage hole is detected only by a mobile terminal device that has been in the Active state.

[Configuration of Base Stations and Mobile Terminal Devices According to First Embodiment]

Figure 2:
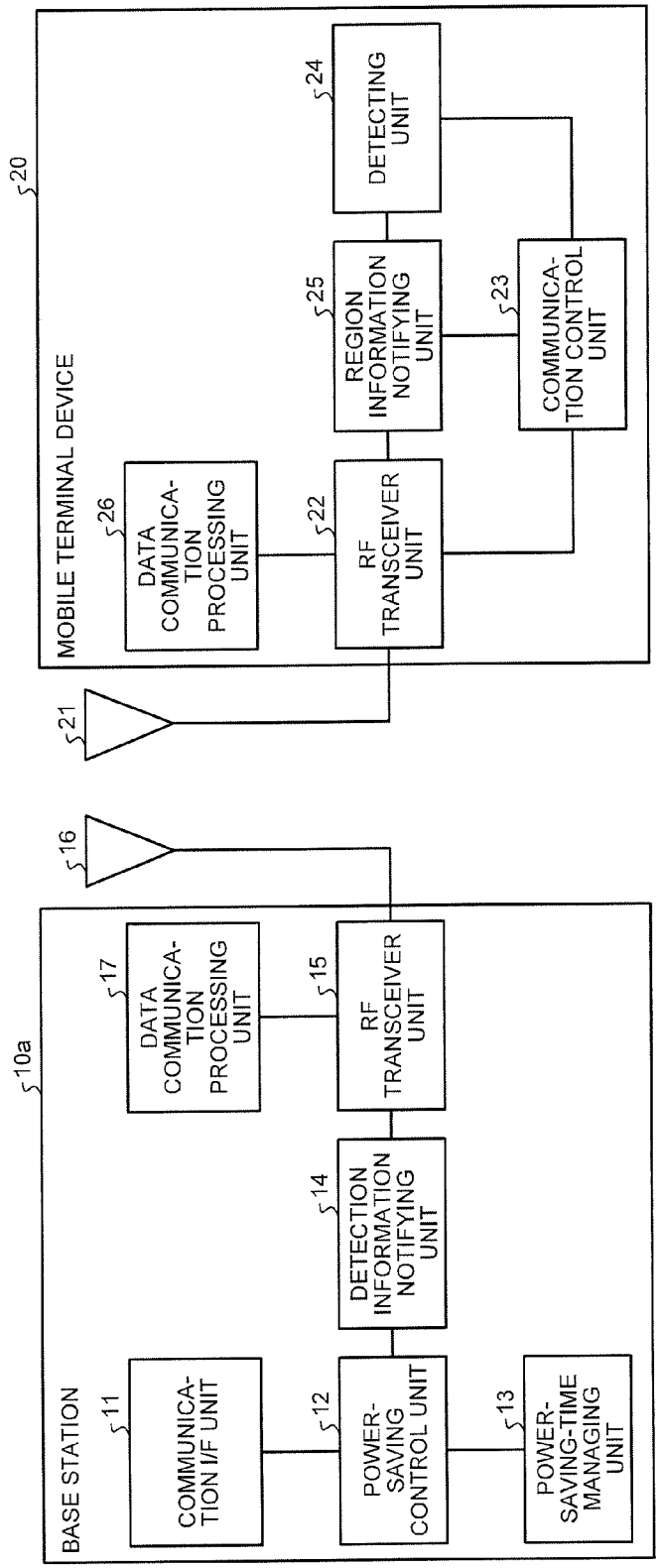
FIG. 2 is a diagram illustrating a configuration example of base stations and mobile terminal devices according to a first embodiment.

Next, the configurations of the base stations and the mobile terminal devices according to the first embodiment will be explained with reference to FIG. 2. FIG. 2 is a diagram illustrating a configuration example of the base stations and the mobile terminal devices according to the first embodiment. The base station 10a illustrated in FIG. 2 is the base station 10a illustrated in FIG. 1, i.e., a base station that performs power-saving. Moreover, a mobile terminal device 20 illustrated in FIG. 2 is the mobile terminal device 20a illustrated in FIG. 1, i.e., a mobile terminal device that detects a coverage hole by causing the communication state to transition to the Active state. The mobile terminal device 20a has a configuration similar to those of the mobile terminal devices 20b to 20i; therefore, in FIG. 2, these are generically referred to as the mobile terminal device 20.

For example, as illustrated in FIG. 2, the base station 10a includes a communication I/F (interface) unit 11, a power-saving control unit 12, a power-saving-time managing unit 13, a detection information notifying unit 14, an RF (Radio Frequency) transceiver unit 15, an antenna 16, and a data communication processing unit 17. Each of these function units is, for example, an integrated circuit, such as an ASIC (Application Specific Integrated Circuit) and an FPGA (Field Programmable Gate Array), or an electronic circuit, such as a CPU (Central Processing Unit) and an MPU (Micro Processing Unit).

The communication I/F unit 11 is, for example, an interface that controls communication between the base station 10a and the control server 30. The communication I/F unit 11 receives an instruction to turn off the power of the base station 10a from the control server 30 and notifies the power-saving control unit 12 of the instruction. For example, when the power-saving control unit 12 receives an instruction related to power-saving control from the control server 30 via the communication I/F unit 11, the power-saving control unit 12 performs power-saving control on the base station 10a in conjunction with the power-saving-time managing unit 13. The power-saving-time managing unit 13, for example, manages the power-off time that indicates the time that elapses before the power of the base station 10a is turned off. The power-off time is arbitrarily determined by the power-saving-time managing unit 13. In other words, in terms of the power-saving control unit 12 and the power-saving-time managing unit 13 operating in conjunction with each other, the power-saving control unit 12 notifies the detection information notifying unit 14 of the power-off time determined by the power-saving-time managing unit 13. Thereafter, when the power-off time has been reached, the power-saving control unit 12 performs power-saving control such that the power of the base station 10a is turned off.

For example, when the detection information notifying unit 14 receives the power-off time from the power-saving control unit 12, the detection information notifying unit 14 determines the detection time, which indicates the time during which a mobile terminal device is caused to detect a coverage hole, which is a region in which it is difficult for a mobile terminal device to communicate with any base stations. Then, the detection information notifying unit 14 notifies the mobile terminal device 20 of the detection information, which includes the power-off time and the detection time, using a predetermined control channel. For example, in an LTE (Long Term Evolution) system, the predetermined control channel is an SIB (System Information Block) or the like. In other words, the detection information notifying unit 14 notifies all the mobile terminal devices that are present in the communication region of the base station 10a of the detection information using a control channel, such as an SIB. The detection information notifying unit 14 notifies the mobile terminal devices of the detection information via the RF transceiver unit 15 and the antenna 16.

For example, after the RF transceiver unit 15 multiplexes digital data that is received from the detection information notifying unit 14 and the data communication processing unit 17 and is to be transmitted, the RF transceiver unit 15 converts it to an RF signal and transmits the data via the antenna 16. Moreover, for example, the RF transceiver unit 15 converts a signal received via the antenna 16 to digital data and notifies the data communication processing unit 17 of the received data. For example, the data communication processing unit 17 performs a process related to data communication different from the process performed by the detection information notifying unit 14.

Moreover, for example, as illustrated in FIG. 2, the mobile terminal device 20 includes an antenna 21, an RF transceiver unit 22, a communication control unit 23, a detecting unit 24, a region information notifying unit 25, and a data communication processing unit 26. Each of these function units is, for example, an integrated circuit, such as an ASIC and an FPGA, or an electronic circuit, such as a CPU and an MPU.

For example, after the RF transceiver unit 22 multiplexes digital data that is received from the region information notifying unit 25 and the data communication processing unit 26 and is to be transmitted, the RF transceiver unit 22 converts it to an RF signal and transmits the data via the antenna 21. Moreover, for example, the RF transceiver unit 22 converts a signal received via the antenna 21 to digital data and notifies the data communication processing unit 26 and the communication control unit 23 of the received data.

For example, when the communication control unit 23 receives the detection information from the base station 10a via the antenna 21 and the RF transceiver unit 22, the communication control unit 23 causes the mobile terminal device 20 to transition to the Active state from the idle state. Moreover, the communication control unit 23 notifies the region information notifying unit 25 whether the communication state of the mobile terminal device 20 is the idle state or the Active state and notifies the detecting unit 24 of the detection information. Moreover, after the detection time has elapsed or after the notification by the region information notifying unit 25, which will be described later, has been made, the communication control unit 23 causes the mobile terminal device 20 to transition to the idle state from the Active state.

For example, in the Active state into which the mobile terminal device 20 is transitioned by the communication control unit 23, the detecting unit 24 detects a coverage hole during the detection time after the power-off time included in the detection information has elapsed. In other words, the detecting unit 24 manages each of the power-off time and the detection time and, when triggered by the occurrence of a radio link failure (RLF) after the power-off time has elapsed, the detecting unit 24 stores, in a memory, various pieces of information, such as the radio quality, location information, and time information, at this point. Moreover, the detecting unit 24 notifies the region information notifying unit 25 of the various pieces of information stored in the memory at a given timing. The detecting unit 24 ends the process related to the detection of a coverage hole after the detection time has elapsed.

For example, when the mobile terminal device 20 is in the Active state and can communicate with a given base station, the region information notifying unit 25 notifies the given base station of the information on the coverage hole detected by the detecting unit 24 via the RF transceiver unit 22 and the antenna 21. The given base station, for example, means the base station 10b or the base station 10c. Moreover, for example, the information on the coverage hole may include only information that indicates that the coverage hole is detected, or may be the radio quality, location information, time information, and the like obtained when the coverage hole is detected. When the region information notifying unit 25 notifies the given base station of the information on the coverage hole, the region information notifying unit 25 notifies the communication control unit 23 that the given base station is notified of the information on the coverage hole. The data communication processing unit 26, for example, performs a process related to data communication different from the process performed by the region information notifying unit 25.

[Configuration of Base Station that does not Perform Power-Saving]

Figure 3:
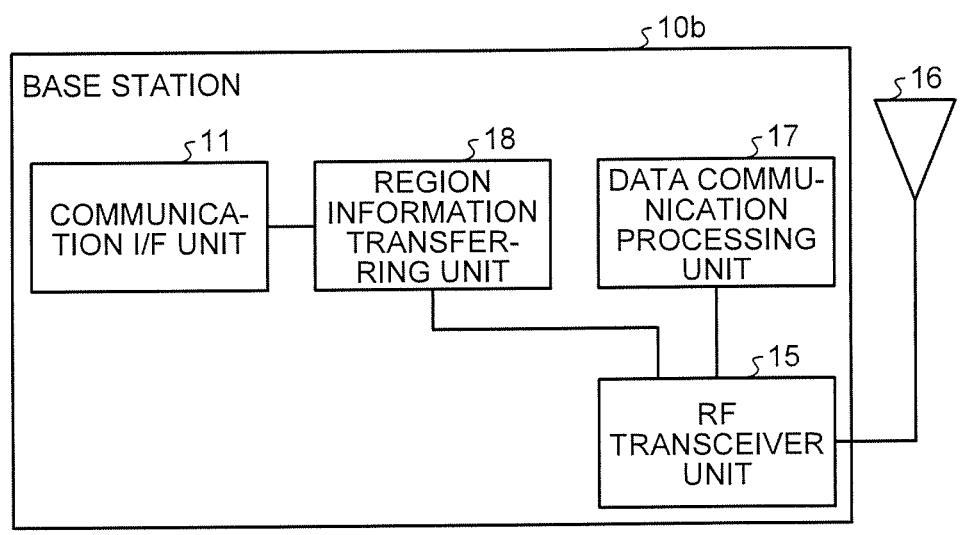
FIG. 3 is a diagram illustrating a configuration example of a base station that does not perform power-saving.

Next, the configuration of the base station that does not perform power-saving will be explained with reference to FIG. 3. FIG. 3 is a diagram illustrating a configuration example of the base station that does not perform power-saving. The base station 10b illustrated in FIG. 3 is the base station 10b illustrated in FIG. 1, i.e., a base station that does not perform power-saving. The base station 10b has a configuration similar to that of the base station 10c illustrated in FIG. 1 and is explained separately from the base station 10a illustrated in FIG. 2 for the sake of convenience of explanation. In the base station 10b illustrated in FIG. 3, the function units that perform a process in a similar manner to those of the base station 10a illustrated in FIG. 2 are denoted by the same reference numerals.

For example, as illustrated in FIG. 3, the base station 10b includes the communication I/F unit 11, the RF transceiver unit 15, the antenna 16, the data communication processing unit 17, and a region information transferring unit 18. These function units are, for example, integrated circuits, such as an ASIC and an FPGA, or electronic circuits, such as a CPU and an MPU.

The communication I/F unit 11 is, for example, an interface that controls communication between the base station 10b and the control server 30. The communication I/F unit 11 receives information on a coverage hole from the region information transferring unit 18 and transmits it to the control server 30. For example, after the RF transceiver unit 15 multiplexes digital data that is received from the data communication processing unit 17 and is to be transmitted, the RF transceiver unit 15 converts it to an RF signal and transmits the data via the antenna 16. Moreover, for example, the RF transceiver unit 15 converts a signal received via the antenna 16 to digital data and notifies the data communication processing unit 17 and the region information transferring unit 18 of the received data. For example, the data communication processing unit 17 performs a process related to data communication different from the process performed by the region information transferring unit 18.

The region information transferring unit 18, for example, receives information on a coverage hole from the mobile terminal device 20 via the antenna 16 and the RF transceiver unit 15. Then, the region information transferring unit 18 transfers the received information on the coverage hole to the control server 30 via the communication I/F unit 11.

[Configuration of Control Server]

Figure 4:
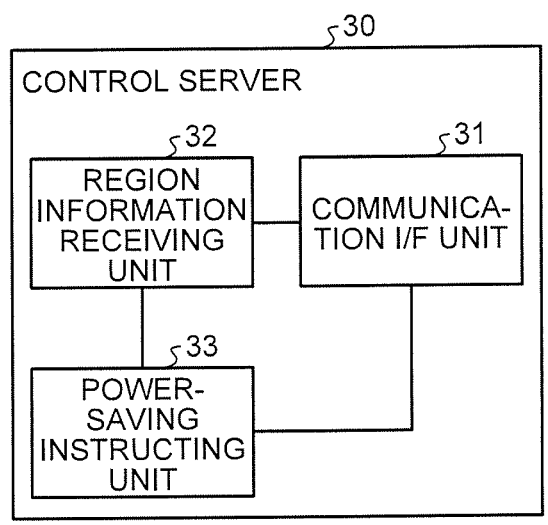
FIG. 4 is a diagram illustrating a configuration example of a control server.

Next, the configuration of the control server will be explained with reference to FIG. 4. FIG. 4 is a diagram illustrating a configuration example of the control server.

For example, as illustrated in FIG. 4, the control server 30 includes a communication I/F unit 31, a region information receiving unit 32, and a power-saving instructing unit 33.

The communication I/F unit 31 is, for example, an interface that controls communication between the control server 30 and each base station. The communication I/F unit 31 receives information on a coverage hole from the base station 10b and notifies the region information receiving unit 32 of the information. Moreover, the communication I/F unit 31 receives data from the power-saving instructing unit 33 and transmits it to the base station 10a.

The region information receiving unit 32, for example, receives information on a coverage hole from the base station 10b via the communication I/F unit 31 and notifies the power-saving instructing unit 33 of the received information. The power-saving instructing unit 33 determines an instruction related to power-saving control based on the information on the coverage hole whose notification is made by the region information receiving unit 32 and transmits the instruction for power-saving control to the base station 10a via the communication I/F unit 31. The instruction related to power-saving control is, for example, an instruction to turn on the power of the base station 10a or to adjust the transmission power when a coverage hole is detected in the communication region of the base station 10a.

[Process Sequence of Base Stations and Mobile Terminal Devices According to First Embodiment]

Figure 5:
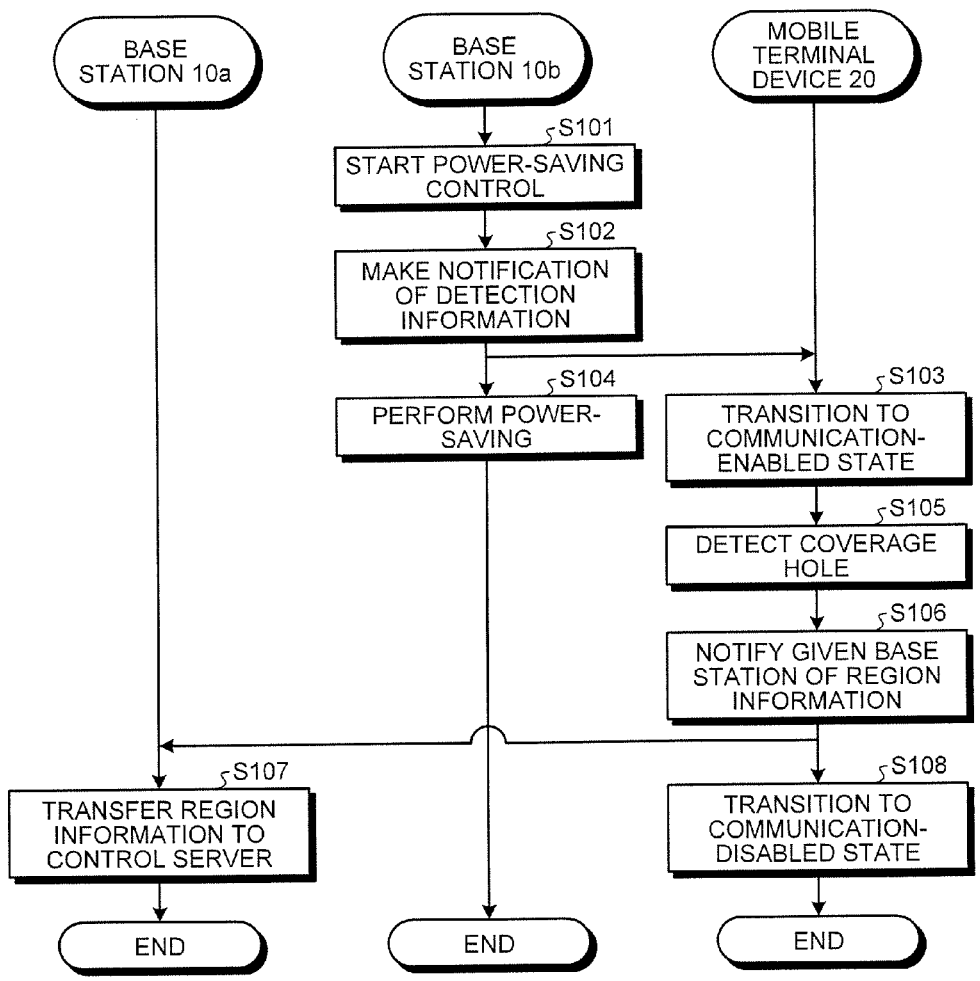
FIG. 5 is a process sequence diagram illustrating an example of the process performed by the base stations and the mobile terminal devices according to the first embodiment.

Next, the process performed by the base stations and the mobile terminal devices according to the first embodiment will be explained with reference to FIG. 5. FIG. 5 is a process sequence diagram illustrating an example of the process performed by the base stations and the mobile terminal devices according to the first embodiment. In FIG. 5, an explanation is given, as an example, of the base station 10a, which is a base station that performs power-saving, the base station 10b, which is a base station that does not perform power-saving, and the mobile terminal device 20.

For example, as illustrated in FIG. 5, the base station 10a starts power-saving control based on an instruction related to power-saving control received from the control server 30 (Step S101). Then, the base station 10a notifies the mobile terminal device 20 of the detection information, which includes the power-off time and the detection time, using a predetermined control channel (Step S102).

Meanwhile, the mobile terminal device 20 that is notified of the detection information transitions to the Active state from the idle state (Step S103). Moreover, when the power-off time has been reached, the base station 10a performs power-saving control such that it turns off its own power (Step S104). Then, the mobile terminal device 20 detects a coverage hole during the detection time after the power-off time (Step S105). Subsequently, when the mobile terminal device 20 becomes such that it can communicate with the base station 10b that is a given base station, the mobile terminal device 20 notifies the base station 10b of the information on the coverage hole (Step S106).

Moreover, the base station 10b that has received the information on the coverage hole from the mobile terminal device 20 transfers the received information on the coverage hole to the control server 30 (Step S107). Thereafter, after the detection time has elapsed or after the notification of the information on the detected coverage hole has been made, the mobile terminal device 20 transitions to the idle state from the Active state (Step S108). After the above process is performed, the control server 30 performs an instruction related to power-saving control on the base station 10a based on the information on the coverage hole transferred from the base station 10b.

[Coverage Hole Detecting Process]

Figure 6:
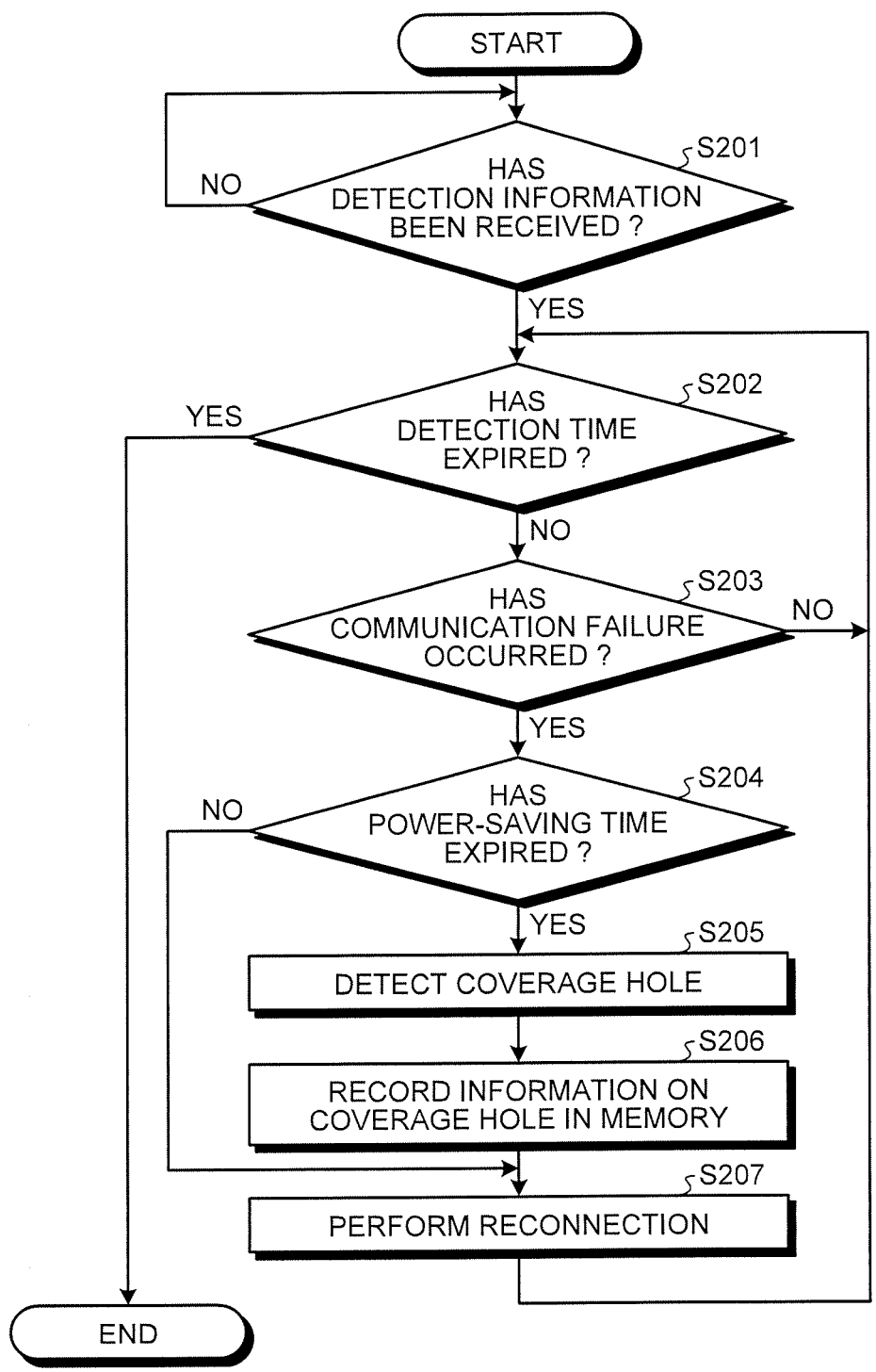
FIG. 6 is a flowchart illustrating an example of the flow of the coverage hole detecting process performed by the mobile terminal device.

Next, the coverage hole detecting process performed by a mobile terminal device will be explained with reference to FIG. 6. FIG. 6 is a flowchart illustrating an example of the flow of the coverage hole detecting process performed by a mobile terminal device. In the explanation in FIG. 6, the mobile terminal device 20 is explained as an example.

For example, as illustrated in FIG. 6, when the mobile terminal device 20 has received the detection information from the base station 10a (positive in Step S201), the mobile terminal device 20 determines whether the detection time included in the detection information has expired (Step S202). When the mobile terminal device 20 has not received the detection information from the base station 10a (negative in Step S201), the mobile terminal device 20 enters a state in which it is waiting for reception of the detection information.

When the detection time has not expired (negative in Step S202), the mobile terminal device 20 determines whether a communication failure has occurred (Step S203). When the detection time has expired (positive in Step S202), the mobile terminal device 20 ends the process. When the mobile terminal device 20 determines that a communication failure has occurred (positive in Step S203), the mobile terminal device 20 determines whether the power-off time that is the power-saving time has expired (Step S204). When the mobile terminal device 20 determines that a communication failure has not occurred (negative in Step S203), the mobile terminal device 20 performs the process in Step S202.

At this time, when the mobile terminal device 20 determines that the power-off time has expired (positive in Step S204), the mobile terminal device 20 detects a coverage hole (Step S205) and records the information on the coverage hole in a memory (Step S206). When the mobile terminal device 20 determines that the power-off time has not expired (negative in Step S204), the mobile terminal device 20 performs the process in Step S207. Specifically, when a communication failure has occurred and the power-off time has not expired, the communication failure is not due to the power-off of the base station 10a; therefore, a normal coverage hole is detected. Thereafter, the mobile terminal device 20 performs a reconnection (Step S207) and performs the process in Step S202 again.

[Effect of First Embodiment]

As described above, in the communication system 1, a region in which it is difficult for a mobile terminal device to communicate with any base stations is detected based on the power-saving time included in the detection information whose notification is made by the base station 10a. Specifically, a mobile terminal device detects the region based on the detection result of a communication disconnection before and after the power-saving time elapses. Moreover, the detection information further includes the detection time during which the region is detected, and a mobile terminal device detects the region based on the detection result of a communication disconnection during the detection time. Consequently, it is satisfactory if the mobile terminal device 20 detects a coverage hole only for a certain period of time before and after a base station performs power control; therefore, a coverage hole that occurs by performing power control can be efficiently detected.

Moreover, in the mobile terminal device 20, the mobile terminal device 20 in the idle state is transitioned to the Active state and is caused to detect a coverage hole during the detection time after the power is turned off. As a result, the communication system 1 increases the number of mobile terminal devices that detect a coverage hole and thus increases the number of samplings for detecting a coverage hole; therefore, the time needed to detect a coverage hole can be reduced compared with the related technology. In other words, in the related technology, a communicating mobile terminal device detects a coverage hole when passing through the coverage hole; however, a communicating mobile terminal device does not always pass through a coverage hole. Therefore, the time needed to detect a coverage hole becomes long. Moreover, in the related technology, a coverage hole is detected only by a communicating mobile terminal device; therefore, the time needed to detect a coverage hole becomes longer. With the above configuration, the mobile terminal device 20 has an effect where the time needed to detect a coverage hole can be shortened compared with the related technology.

Second Embodiment

In the above first embodiment, a case where the power of a base station is turned off is explained; however, it is possible to turn off the power of only the transmitting circuit of a base station. In the second embodiment, a case will be explained where the power of only the transmitting circuit of a base station is turned off.

[Configuration of Base Stations and Mobile Terminal Devices According to Second Embodiment]

Figure 7:
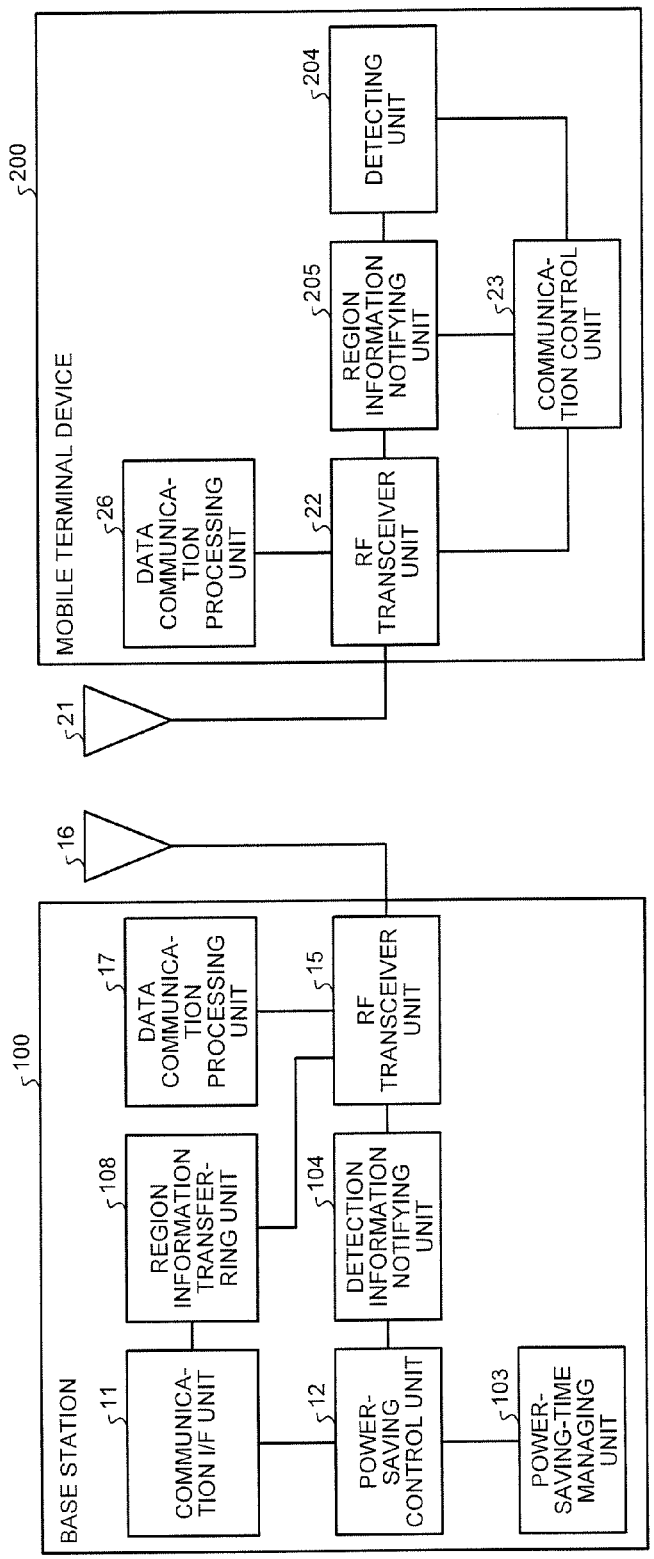
FIG. 7 is a diagram illustrating a configuration example of base stations and mobile terminal devices according to a second embodiment.

The configuration of base stations and mobile terminal devices according to the second embodiment will be explained with reference to FIG. 7. FIG. 7 is a diagram illustrating a configuration example of the base stations and the mobile terminal devices according to the second embodiment. In a base station 100 illustrated in FIG. 7, the function units that perform a process in a similar manner to those of the base station 10a illustrated in FIG. 2 are denoted by the same reference numerals. Moreover, in a mobile terminal device 200 illustrated in FIG. 7, the function units that perform a process in a similar manner to those of the mobile terminal device 20 illustrated in FIG. 2 are denoted by the same reference numerals.

For example, as illustrated in FIG. 7, the base station 100 includes the communication I/F unit 11, the power-saving control unit 12, a power-saving-time managing unit 103, a detection information notifying unit 104, the RF transceiver unit 15, the antenna 16, the data communication processing unit 17, and a region information transferring unit 108. Each of these function units is, for example, an integrated circuit, such as an ASIC and an FPGA, or an electronic circuit, such as a CPU and an MPU.

The communication I/F unit 11 is, for example, an interface that controls communication between the base station 100 and the control server 30. The communication I/F unit 11 receives an instruction to turn off the transmitting circuit of the base station 100 from the control server 30 and notifies the power-saving control unit 12 of the instruction. Moreover, for example, the communication I/F unit 11 receives information on a coverage hole from the region information transferring unit 108 and transmits it to the control server 30.

For example, when the power-saving control unit 12 receives an instruction related to power-saving control from the control server 30 via the communication I/F unit 11, the power-saving control unit 12 performs power-saving control on the base station 100 in conjunction with the power-saving-time managing unit 103. The power-saving-time managing unit 103, for example, manages the power-off time that indicates the time that elapses before the power of the transmitting circuit of the base station 100 is turned off. The power-off time is arbitrarily determined by the power-saving-time managing unit 103. In other words, in terms of the power-saving control unit 12 and the power-saving-time managing unit 103 operating in conjunction with each other, the power-saving control unit 12 notifies the detection information notifying unit 104 of the power-off time determined by the power-saving-time managing unit 103. Thereafter, when the power-off time of the transmitting circuit has been reached, the power-saving control unit 12 performs power-saving control such that the power of the transmitting circuit of the base station 100 is turned off. In other words, when the power of only the transmitting circuit is turned off, the base station 100 can still receive data transmitted from the mobile terminal device 200. The power-saving control unit 12 may turn off the power of the receiving circuit at a given timing.

For example, when the detection information notifying unit 104 receives the power-off time from the power-saving control unit 12, the detection information notifying unit 104 determines the detection time. Then, the detection information notifying unit 104 notifies the mobile terminal device 200 of the detection information, which includes the power-off time and the detection time, using a predetermined control channel. For example, in an LTE system, the predetermined control channel is an SIB or the like. In other words, the detection information notifying unit 104 notifies all the mobile terminal devices that are present in the communication region of the base station 100 of the detection information using a control channel, such as an SIB. The detection information notifying unit 104 notifies the mobile terminal devices of the detection information via the RF transceiver unit 15 and the antenna 16.

For example, after the RF transceiver unit 15 multiplexes digital data that is received from the detection information notifying unit 104 and the data communication processing unit 17 and is to be transmitted, the RF transceiver unit 15 converts it to an RF signal and transmits the data via the antenna 16. Moreover, for example, the RF transceiver unit 15 converts a signal received via the antenna 16 to digital data and notifies the data communication processing unit 17 and the region information transferring unit 108 of the received data. For example, the data communication processing unit 17 performs a process related to data communication different from the process performed by the detection information notifying unit 104.

The region information transferring unit 108, for example, receives information on a coverage hole from the mobile terminal device 200 via the RF transceiver unit 15 and the antenna 16. Then, the region information transferring unit 108 transfers the received information on the coverage hole to the control server 30 via the communication I/F unit 11.

Moreover, for example, as illustrated in FIG. 7, the mobile terminal device 200 includes the antenna 21, the RF transceiver unit 22, the communication control unit 23, a detecting unit 204, a region information notifying unit 205, and the data communication processing unit 26. Each of these function units is, for example, an integrated circuit, such as an ASIC and an FPGA, or an electronic circuit, such as a CPU and an MPU.

For example, after the RF transceiver unit 22 multiplexes digital data that is received from the region information notifying unit 205 and the data communication processing unit 26 and is to be transmitted, the RF transceiver unit 22 converts it to an RF signal and transmits the data via the antenna 21. Moreover, for example, the RF transceiver unit 22 converts a signal received via the antenna 21 to digital data and notifies the data communication processing unit 26 and the communication control unit 23 of the received data.

For example, when the communication control unit 23 receives the detection information from the base station 100 via the antenna 21 and the RF transceiver unit 22, the communication control unit 23 causes the mobile terminal device 200 to transition to the Active state from the idle state. Moreover, the communication control unit 23 notifies the region information notifying unit 205 whether the communication state of the mobile terminal device 200 is the idle state or the Active state and notifies the detecting unit 204 of the detection information. Moreover, after the detection time has elapsed or after the notification by the region information notifying unit 205, which will be described later, has been made, the communication control unit 23 causes the mobile terminal device 200 to transition to the idle state from the Active state.

For example, in the Active state into which the mobile terminal device 200 is transitioned by the communication control unit 23, the detecting unit 204 detects a coverage hole during the detection time after the power-off time of the transmitting circuit included in the detection information has elapsed. In other words, the detecting unit 204 manages each of the power-off time and the detection time and, when triggered by the occurrence of a radio link failure (RLF) after the power-off time has elapsed, the detecting unit 204 stores, in a memory, various pieces of information, such as the radio quality, location information, and time information, at this point. Moreover, the detecting unit 204 notifies the region information notifying unit 205 of the various pieces of information stored in the memory at a given timing. The detecting unit 204 ends the process related to the detection of a coverage hole after the detection time has elapsed.

For example, when the mobile terminal device 200 is in the Active state and can communicate with the base station 100, the region information notifying unit 205 notifies the base station 100 of the information on the coverage hole detected by the detecting unit 204 via the antenna 21 and the RF transceiver unit 22. Moreover, for example, the information on the coverage hole may include only information that indicates that the coverage hole is detected, or may be the radio quality, location information, time information, and the like obtained when the coverage hole is detected. When the region information notifying unit 205 notifies the base station 100 of the information on the coverage hole, the region information notifying unit 205 notifies the communication control unit 23 that the base station 100 is notified of the information on the coverage hole. The data communication processing unit 26, for example, performs a process related to data communication different from the process performed by the region information notifying unit 205.

[Process Sequence of Base Stations and Mobile Terminal Devices According to Second Embodiment]

Figure 8:
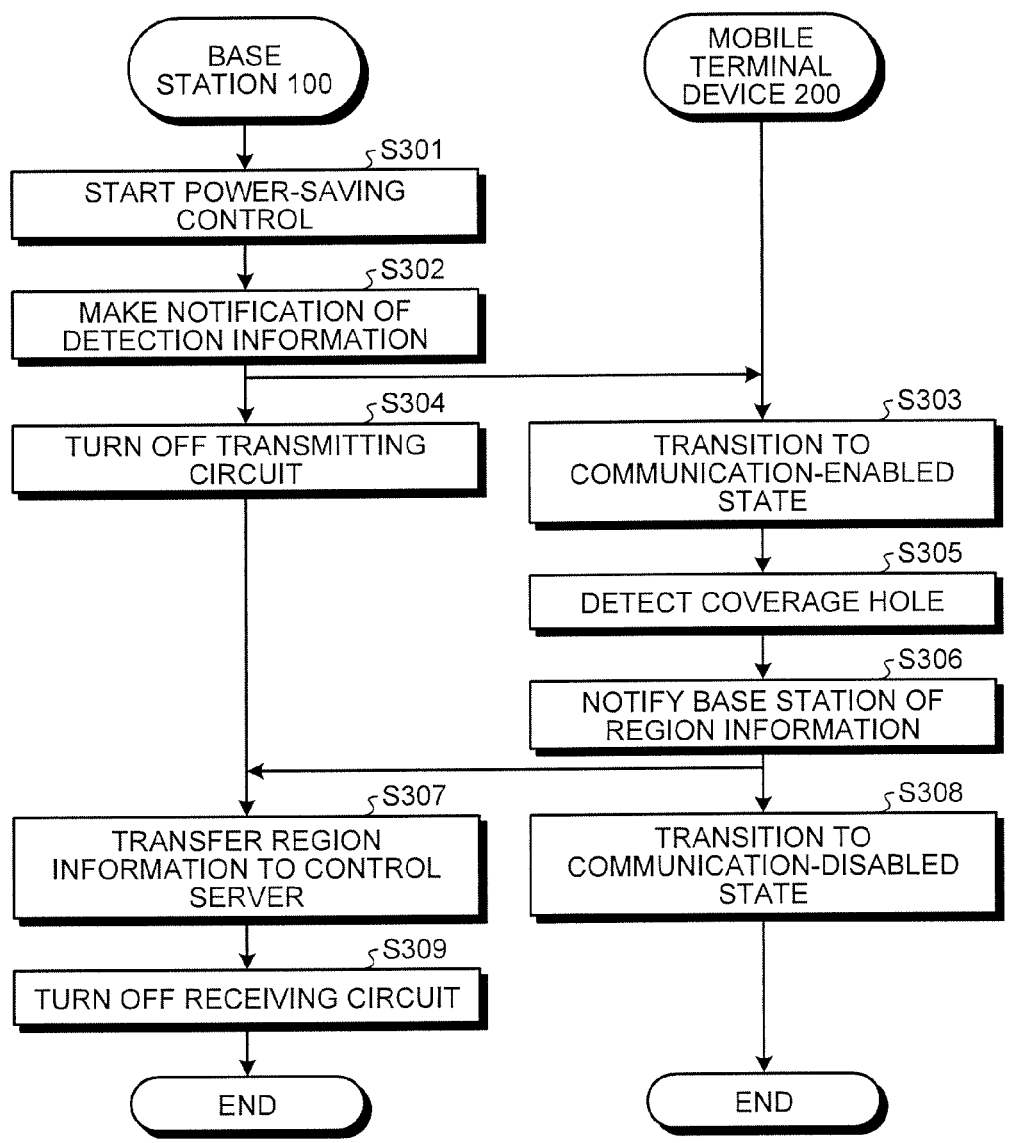
FIG. 8 is a process sequence diagram illustrating an example of the process performed by the base stations and the mobile terminal devices according to the second embodiment.

Next, the process performed by the base stations and the mobile terminal devices according to the second embodiment will be explained with reference to FIG. 8. FIG. 8 is a process sequence diagram illustrating an example of the process performed by the base stations and the mobile terminal devices according to the second embodiment. In FIG. 8, an explanation is given, as an example, of the base station 100, which is a base station that performs power-saving of the transmitting circuit, and the mobile terminal device 200.

For example, as illustrated in FIG. 8, the base station 100 starts power-saving control based on an instruction related to power-saving control received from the control server 30 (Step S301). Then, the base station 100 notifies the mobile terminal device 200 of the detection information, which includes the power-off time and the detection time, related to the transmitting circuit using a predetermined control channel (Step S302).

Meanwhile, the mobile terminal device 200 that is notified of the detection information transitions to the Active state from the idle state (Step S303). Moreover, when the power-off time of the transmitting circuit has been reached, the base station 100 performs power-saving control such that it turns off the power of its own transmitting circuit (Step S304). Then, the mobile terminal device 200 detects a coverage hole during the detection time after the power-off time (Step S305). Subsequently, the mobile terminal device 200 notifies the base station 100 of the information on the coverage hole (Step S306).

Moreover, the base station 100 that has received the information on the coverage hole from the mobile terminal device 200 transfers the received information on the coverage hole to the control server 30 (Step S307). Thereafter, after the detection time has elapsed or after the notification of the information on the detected coverage hole has been made, the mobile terminal device 200 transitions to the idle state from the Active state (Step S308). Moreover, after the base station 100 notifies the control server 30 of the information on the coverage hole, the base station 100 turns off the power of its own receiving circuit at a given timing (Step S309). After the above process is performed, the control server 30 performs an instruction related to power-saving control on the base station 100 based on the information on the coverage hole transferred from the base station 100.

[Effect of Second Embodiment]

As described above, in the communication system 1, the mobile terminal device 200 in the idle state is caused to transition to the Active state based on the detection information whose notification is made by the base station 100 and which includes the power-off time after which only the transmitting circuit is turned off and the mobile terminal device 200 is caused to detect a coverage hole. Moreover, the mobile terminal device 200 notifies the base station 100 of the information on the detected coverage hole. As a result, the communication system 1 immediately notifies the base station of the information on the detection of a coverage hole. Therefore, the power-saving control process in accordance with a coverage hole can be performed more promptly and the time needed to detect a coverage hole can be shortened.

Third Embodiment

In the first and second embodiments described above, an explanation is given of a case where all the mobile terminal devices present in the communication region of a base station are notified of the detection information; however, a predetermined mobile terminal device present in the communication region of a base station may be notified of the detection information. In the third embodiment, an explanation is given of a case where a predetermined mobile terminal device present in the communication region of a base station is notified of the detection information.

[LTE Network]

Figure 9:
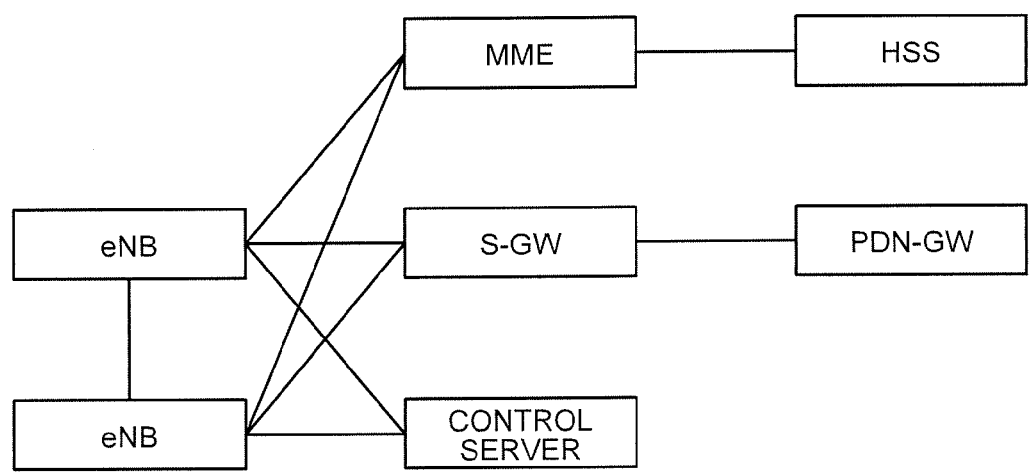
FIG. 9 is a diagram explaining an example of an LTE network.

An LTE network will be explained with reference to FIG. 9. FIG. 9 is a diagram explaining an example of an LTE network. For example, as illustrated in FIG. 9, the LTE network includes eNBs (evolutional Nodes B), an MME (Mobility Management Entity), and an HSS (Home Subscriber Server). In addition, the LTE network includes an S-GW (Serving—Gate Way), a PDN-GW (Packet Data Network—Gate Way), and a control server.

Among them, the eNB is a base station. The MME is a node that manages incoming calls and the like. The HSS is a node that deals with information on subscriber terminals. The S-GW is a node that performs switching between the PDN-GW and the eNB. The PDN-GW is a node that is a window to the Internet. A plurality of PDN-GWs are arranged per APN (Access Point Network), which is a connection destination, or per plurality of APNs. In a similar manner, a plurality of eNBs are arranged in accordance with the number of base stations.

[Process Sequence of Individually Making Notification of Detection Information According to Third Embodiment]

Figure 10:
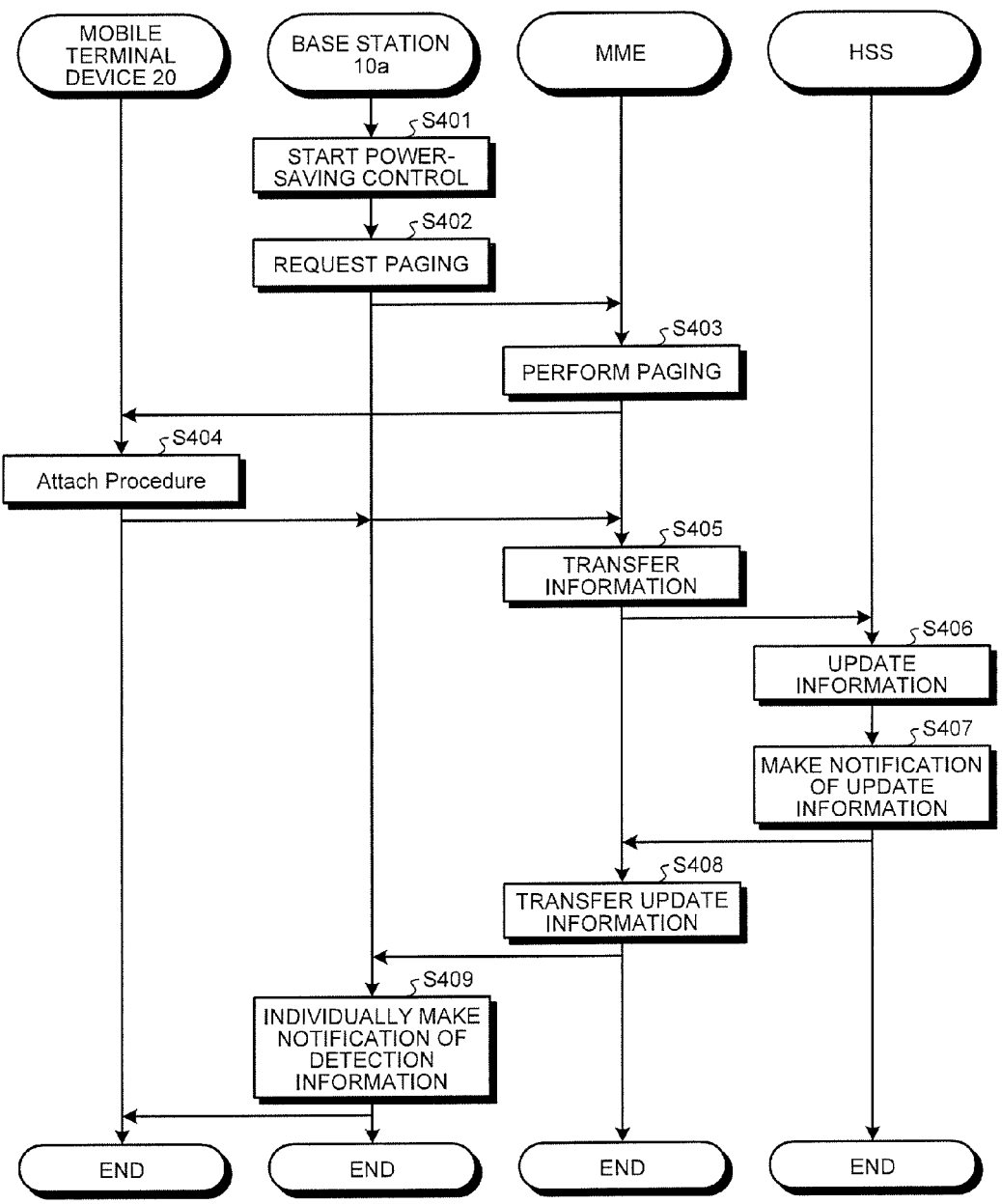
FIG. 10 is a process sequence diagram illustrating an example of the process of individually making a notification of detection information according to a third embodiment.

Next, the process of individually making a notification of the detection information according to the third embodiment will be explained with reference to FIG. 10. FIG. 10 is a process sequence diagram illustrating an example of the process of individually making a notification of the detection information according to the third embodiment. In FIG. 10, an explanation is given, as an example, of the base station 10a, which is a base station that performs power-saving, the mobile terminal device 20, the MME, and the HSS.

For example, as illustrated in FIG. 10, the base station 10a starts power-saving control based on an instruction related to power-saving control received from the control server 30 (Step S401). Then, the base station 10a requests the connected MME to page the mobile terminal devices that are in the idle state and are present in its own communication region (Step S402).

The MME that has received the paging request pages all the mobile terminal devices that may be present in the communication region of the base station 10a (Step S403). In the example in FIG. 10, the MME pages the mobile terminal device 20. The paged mobile terminal device 20 establishes radio communication by starting the Attach Procedure and transmits performance information on itself to the MME (Step S404). The performance information is, for example, information that indicates whether the device itself has a function of detecting a coverage hole.

The MME that has received the performance information transfers the received performance information to the HSS (Step S405). The HSS that has received the performance information updates the information on the UE (User Equipment) managed by the node itself (Step S406). Then, the HSS notifies the MME of the updated information (Step S407). Moreover, the MME transfers the update information received from the HSS to the base station 10a (Step S408).

The base station 10a that has received the update information individually notifies the mobile terminal device 20 of the detection information based on the received update information (Step S409). In other words, the base station 10a obtains the information on the UE Class managed by the HSS via the MME. Then, the base station 10a, for example, determines whether the corresponding mobile terminal device has a function of detecting a coverage hole and determines whether the function of detecting a coverage hole is up-to-date based on the UE Class information. Consequently, when the mobile terminal device deals with detection of a coverage hole, the base station 10a continues the process and, when the mobile terminal device does not deal with detection of a coverage hole, the base station 10a performs a process of disconnecting the communication with the mobile terminal device. In FIG. 10, the process from Step S409 is similar to the first and second embodiments and the like; therefore, an explanation thereof is omitted.

[Effect of Third Embodiment]

As described above, in the communication system 1, the mobile terminal devices that are preferable for detecting a coverage hole are individually notified of the detection information and the corresponding mobile terminal devices are caused to detect a coverage hole. As a result, the communication system 1 can reduce the time needed to detect a coverage hole while suppressing use of resources related to the communication in the communication system 1.

Fourth Embodiment

The embodiments of the communication system disclosed in the present application has been explained; however, it may be embodied in various different forms other than the above-described embodiments. A different embodiment of (1) transition of communication state, (2) power-saving time, and (3) configuration will be explained.

(1) Transition of Communication State

In the above embodiments, an explanation is given of the case where a mobile terminal device is notified of the detection information, which includes the power-saving time and the detection time; however, it is possible that a mobile terminal device is notified of detection information that further includes instruction information, which causes a mobile terminal device to transition to the Active state from the idle state, in addition to the power-saving time and the detection time. For example, a base station notifies a mobile terminal device of the detection information that includes the power-saving time, the detection time, and the instruction information. The mobile terminal device that has received the detection information refers to the instruction information included in the detection information and transitions to the Active state from the idle state.

(2) Power-Saving Time

In the above first to third embodiments, an explanation is given of the case where the time that elapses before the power of a base station is turned off, the time that elapses before the power of the transmitting circuit of a base station is turned off, or the like is used as the power-saving time; however, the time that elapses before the transmission power of a base station is adjusted may be used as the power-saving time. For example, in the case of the adjustment of the transmission power, a base station sets the transmission power value for itself and a mobile terminal device detects a coverage hole during the detection time after the adjustment of the transmission power.

(3) Configuration

Information (for example, content of the information on a coverage hole that a base station is notified of) that includes process procedures, control procedures, specific names, various pieces of data, parameters, and the like illustrated in the above description, drawings, and the like can be arbitrarily changed unless otherwise specified.

Moreover, each component, such as the base station 10a (the base station 100) and the mobile terminal device 20 (the mobile terminal device 200) in the communication system 1 illustrated in the drawings, is formed based on functional concept and does not have to be configured physically the same as those illustrated in the drawings. In other words, a specific form of division/integration of each device is not limited to those illustrated in the drawings and it may be configured such that all or part thereof is functionally or physically divided or integrated in arbitrary units depending on various loads, use conditions, or the like. For example, the detection information notifying unit 14 may be divided into a "detection information generating unit" that generates the detection information and a "detection-information-con-trol-channel notifying unit" that makes a notification of the detection information using a predetermined control channel. In a similar manner, for example, the detection information notifying unit 104 may be divided into a "detection information generating unit" that generates the detection information and a "detection-information-individual-channel notifying unit" that makes a notification of the detection information using an individual channel. Moreover, for example, the detecting unit 24 may be divided into a "power-saving-time managing unit" that manages the power-saving time, a "detection-time managing unit" that manages the detection time, and a "detecting unit" that detects a coverage hole during the detection time after the power-saving time. In a similar manner, for example, the detecting unit 204 may be divided into a "power-saving-time managing unit" that manages the power-saving time, a "detection-time managing unit" that manages the detection time, and a "detecting unit" that detects a coverage hole during the detection time after the power-saving time.

An aspect of the communication system, the communication method, the mobile terminal device, and the base station disclosed in the present application has an effect where a coverage hole that occurs when a base station performs power control can be efficiently detected by a base station performing power control.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication system that comprises a base station and a mobile terminal device, wherein:
    the base station includes a first processor, wherein the first processor executes a process including first notifying, using a predetermined control channel, the mobile terminal device of detection information that includes a power-saving time that indicates a time that elapses before the base station enters a power-saving state, and
    the mobile terminal device includes a second processor, wherein the second processor executes a process including:
    detecting a region in which a mobile terminal device is not capable of communicating with any base station based on a detection of a communication disconnection before and after the power-saving time elapses;
    starting detecting the region, when notified that the detection information is received by the first notifying;
    ending detecting the region, when the detecting detects the region in which a mobile terminal device is not capable of communicating with any base station;
    ending detecting the region, when a detection time, being longer than the power-saving time included in the detection information, has expired; and
    second notifying a given base station of information on the region detected by the detecting.

2. The communication system according to claim 1, wherein:
    the detection information further includes the detection time during which the region is detected, and the detecting detects the region based on a detection of a communication disconnection during the detection time.

3. The communication system according to claim 1, wherein the second processor is configured to execute the process further including controlling, when being notified of the detection information by the first notifying, the mobile terminal device to transition to a communication-enabled state from a communication-disabled state.

4. The communication system according to claim 1, wherein the notifying notifies, using a predetermined control channel, the mobile terminal device of detection information that includes a power-saving time that indicates a time that elapses before a power of the base station is turned off, a time that elapses before a power of a transmitting circuit of the base station is turned off, or a time that elapses before adjustment of a transmission power of the base station and the detection time.

5. The communication system according to claim 1, wherein: the first notifying notifies, using a predetermined control channel, the mobile terminal device of detection information that includes a power-saving time that indicates a time that elapses before a power of a transmitting circuit of the base station is turned off and the detection time,
the detecting detects the region during the detection time after the time that is included in the detection information and that elapses before the power of the transmitting circuit of the base station is turned off has elapsed, and
the second notifying notifies the base station of information on the region detected by the detecting.

6. The communication system according to claim 1, wherein the first notifying individually notifies a predetermined mobile terminal device of the detection information.

7. The communication system according to claim 3, wherein the controlling causes the mobile terminal device to transition to a communication-disabled state from a communication-enabled state after the detection time has elapsed or after notification by the second notifying has been made.

8. A communication method of a communication system that includes a base station and a mobile terminal device, the method comprising:
notifying, using a predetermined control channel, the mobile terminal device of detection information that includes a power-saving time that indicates a time that elapses before the base station enters a power-saving state, by the base station;
detecting a region based on a detection of a communication disconnection before and after the power-saving time elapses;
starting detecting a region in which a mobile terminal device is not capable of communicating with any base station, when being notified that the detection information is received, by the mobile terminal device;
ending detecting the region, when the region in which a mobile terminal device is not capable of communicating with any base station is detected;
ending detecting the region, when a detection time being longer than the power-saving time included in the detection information has expired, by the mobile terminal device; and
notifying a given base station of information on the detected region, by the mobile terminal device.

9. A mobile terminal device comprising a processor, wherein the processor is configured to execute a process including:
starting detecting a region in which a mobile terminal device is not capable of communicating with any base station based on a detection of a communication disconnection before and after the power-saving time elapses;
ending detecting the region, when the detecting detects the region in which a mobile terminal device is not capable of communicating with any base station;
ending detecting the region, when a detection time being longer than the power-saving time included in the detection information has expired; and
notifying a given base station of information on the region detected by the detecting.

* * * * *